United States Patent
Yu et al.

(10) Patent No.: US 6,368,440 B1
(45) Date of Patent: Apr. 9, 2002

(54) METHOD FOR FABRICATING A FLEXIBLE BELT WITH A PUZZLE-CUT SEAM

(75) Inventors: Robert C. U. Yu, Webster; Edward L. Schlueter, Jr., Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/532,556

(22) Filed: Mar. 22, 2000

(51) Int. Cl.[7] .............................. B65G 15/30; F16G 1/14
(52) U.S. Cl. .................. 156/137; 156/203; 156/304.5; 156/304.6; 156/311
(58) Field of Search ................................ 156/137, 203, 156/218, 304.3, 304.5, 304.6, 309.6, 311

(56) References Cited

U.S. PATENT DOCUMENTS

| | | | | |
|---|---|---|---|---|
| 3,988,399 A | | 10/1976 | Evans | 264/22 |
| 4,050,322 A | * | 9/1977 | Moring | 74/231 J |
| 4,265,990 A | | 5/1981 | Stolka et al. | 430/59 |
| 4,410,575 A | | 10/1983 | Obayashi et al. | 428/57 |
| 4,430,146 A | * | 2/1984 | Johnson | 156/502 |
| 4,532,166 A | | 7/1985 | Thomsen et al. | 428/57 |
| 4,883,742 A | | 11/1989 | Wallbillich et al. | 430/275 |
| 5,487,707 A | | 1/1996 | Sharf et al. | 474/253 |
| 5,552,005 A | | 9/1996 | Mammino et al. | 156/157 |
| 5,690,769 A | * | 11/1997 | Daigle et al. | 156/158 |

\* cited by examiner

*Primary Examiner*—Sam Chuan Yao
(74) *Attorney, Agent, or Firm*—Wayne J. Egan

(57) ABSTRACT

A flexible electrostatographic imaging member belt comprises two ends with matching puzzle-cut patterns of fingers arranged to be joined. The belt is fabricated by a method comprising the steps of: first, joining the two belt ends to form a juncture; second, applying an adhesive strip to the juncture; third, applying a compressing force to the adhesive strip; fourth, heating the adhesive strip for a heating period; fifth, cooling the adhesive strip for a cooling period; thus forming a puzzle-cut seam; and, sixth, determining when the puzzle-cut seam is satisfactory. When it is determined the puzzle-cut seam is not satisfactory, the heating and cooling steps are repeated. When it is determined the puzzle-cut seam is satisfactory, the compressing force is removed. In one embodiment, the method determines when the puzzle-cut seam is satisfactory based on the total time heat is applied to the adhesive strip.

17 Claims, 8 Drawing Sheets

METHOD FOR FABRICATING A FLEXIBLE BELT WITH A PUZZLE-CUT SEAM

CROSS-REFERENCE TO RELATED APPLICATIONS

This application is related to commonly-assigned co-pending application Ser. No. 08/721,418, filed Sep. 26, 1996 by inventors Edward L. Schlueter, Jr. et al., entitled "Process and apparatus for producing an endless seamed belt," now allowed. The disclosure of the foregoing commonly-assigned co-pending patent application is hereby incorporated by reference verbatim, with the same effect as though such disclosure were fully and completely set forth herein. It is noted that the same Edward L. Schlueter, Jr. is a named inventor both in the earlier co-pending application Ser. No. 08/721,418, and in the present application.

FIELD OF THE INVENTION

This invention relates in general to a low profile seam preparation method and, more specifically, to a thin seam preparation method as well as a post seaming treatment process for flexible imaging member belts application.

BACKGROUND OF THE INVENTION

Flexible imaging member belts in electrostatographic imaging system are well known in the art. Typical flexible imaging member belt include, for example, electrophotographic imaging member belts or photoreceptors for electrophotographic imaging systems, ionographic imaging member belts or electroreceptors for electrographic imaging systems, and intermediate image transfer belts for transferring toner images used in an electrophotographic or an electrographic imaging system. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the charge transport layer of an electrophotographic imaging member belt, the dielectric imaging layer of an ionographic imaging member belt, and the transfer layer of an intermediate transfer belt. Thus, the thermoplastic polymeric matrix material in the imaging layer is located in the upper portion of a cross section of an electrostatographic imaging member belt whereas the substrate layer being in the lower portion of the cross section of the electrostatographic imaging member belt. Although the flexible electrostatographic imaging member belts of interest include the mentioned types, for simplicity reasons, the discussion hereinafter will be focused on the electrophotographic imaging member belts as the representation.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the disclosure of the foregoing patent being hereby incorporated by reference verbatim, with the same effect as though such disclosure were fully and completely set forth herein. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers were developed, fatigue induced cracking at the welded seam area is frequently encountered during photoreceptor belt cycling. Moreover, the onset of seam cracking has also been found to rapidly lead to seam delamination due to fatigue thereby shortening belt service life. Dynamic fatigue seam cracking and delamination may possibly happen in ionographic imaging member belts as well as in the intermediate image transfer belts.

The flexible electrophotographic imaging member belts are fabricated from a sheet cut from an imaging member web. The sheets are generally rectangular or parallelogram in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of flexible multilayered electrophotographic imaging member belts may occasionally contain undesirable high protrusions such as peaks, ridges, spikes, and mounds. These seam protrusions present problems during image cycling of the belt machine because they interact with cleaning blades to cause blade wear and tear which ultimately affect cleaning blade efficiency and service life. Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member. Another frequently observed mechanical failure in the imaging belts during image cycling is that the ultrasonically welded seam of an electrophotographic imaging member belt can also cause initiation of cracks in the seam which then propagate and lead to delamination after being subjected to extended bending and flexing cycles over small diameter belt support rollers of an imaging machine or when due to lateral forces caused by mechanical rubbing contact against stationary web edge guides of a belt support module during cycling. Seam cracking and delamination has also been found to be further aggravated when the belt is employed in electrophotographic imaging systems utilizing blade cleaning devices and some operational imaging subsystems. Alteration of materials in the various photoreceptor belt layers such as the conductive layer, hole blocking layer, adhesive layer, charge generating layer, and/or charge transport layer to suppress cracking and delamination problems is not easily accomplished.

For example, when a flexible imaging member belt used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The joining techniques, particularly the welding process, can result in the formation of a splashing that projects out from either side of the seam in the overlap region of the belt. The overlap region and spashings on each side of the overlap region comprise a strip from one edge of the belt to the other that is referred herein as the "seam region". Because of the splashing, a typical flexible imaging member belt is about 1.6 times thicker in the seam region than that of the remainder of the belt (e.g., in a typical example, 188 micrometers versus 116 micrometers).

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamination causing premature mechanical failure in the belt. Thus, the splashing tends to shorten the mechanical life of the seam and service life of the flexible member belts used in copiers, duplicators, and printers.

Since there is no effective way to prevent the generation of localized high protrusions at the seam, imaging member belts are inspected, right after seam welding belt production process, manually by hand wearing a cotton glove through passing the index finger over the entire seam length and belts found catching the glove by the protrusions are identified as production rejects. Both the time consuming procedure of manual inspection and the number of seamed belts rejected due to the presence of high seam protrusions constitute a substantial financial burden on the production cost of imaging member belts.

An advanced imaging member belt seaming technique has recently been successfully developed and demonstrated in recent years, by creating a puzzle-cut of male pattern at one end of an imaging member sheet and a matching puzzle-cut female pattern at the opposite end so that when butt joining them together by mating the puzzle-cut patterns and then secured the joint with application of an adhesive layer over it to form an endless flexible belt. Although this novel puzzle-cut seaming process represents a new breakthrough seaming technology and offers great promise, however the seam formed still has some physical, mechanical, and dimensional shortfalls yet remained to be overcome.

Therefore, there is an urgent need to provide seamed flexible imaging belts with an improved seam morphology which can withstand greater dynamic fatigue conditions thereby extending belt service life. It is also important, from the imaging member belt production point of view, that effective cutting of unit manufacturing cost of seamed imaging belts can be realized if an innovative post seaming treatment process can be developed for puzzle-cut seam joint improvement that overcomes the shortfalls and provides the triple benefits of seam region thickness reduction, seam surface morphological smoothing, and good mechanical seam strength.

U.S. Pat. No. 5,552,005 to Mammino et al., issued Sep. 3, 1996, discloses a flexible imaging sheet and a method of constructing a flexible imaging sheet. The method of constructing a flexible imaging sheet comprises a step of overlapping, a step of joining, and a step of shaping. In the step of overlapping, a first marginal end region and a second marginal end region of a sheet are overlapped to form an overlap region and a non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region. The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

U.S. Pat. No. 4,410,575 to Obayashi et al., issued Oct. 18, 1983, discloses that textile fabrics are firmly lap welded to each other by superposing two end portions of one or two fabrics on each other while interposing a piece of a synthetic polymeric bonding tape between the superposed two end portions and by applying a high frequency wave treatment and/or heat treatment to the interposed portion of the bonding tape through at least one of the superposed end portions while pressing them, to melt the interposed portion of the bonding tape thereby lap welding the end portions of the fabric or fabrics to each other.

U.S. Pat. No. 4,883,742 to Wallbillich et al., issued Nov. 28, 1989, discloses a process for seamless and firm joining of the end and/or lateral areas of thermoplastically processible photosensitive layers, by which the end and/or lateral areas of one or more solvent-free and unsupported thermoplastically processible photosensitive layers are overlapped avoiding bubbles and with displacement of the air between the end and/or lateral areas, the total layer material is then heated under pressure and with joining of the overlapping end and/or lateral areas, and the resulting continuously joined photosensitive layer is then after treated and smoothed with shaping to exact size.

U.S. Pat. No. 4,532,166 to Thomsen et al., issued Jul. 30, 1985, discloses a welded web which is prepared by overlapping a first edge over a second edge, then applying heat necessary to bond the first edge with the second edge. The heating techniques may include ultrasonic welding, radio frequency heating, and the like.

U.S. Pat. No. 3,988,399 to Evans, issued Oct. 26, 1996, discloses heat recoverable articles which have an elongate S-shaped configuration, which later can be wrapped about a substrate. The articles comprise a molecularly oriented unitary polymeric layer which has been differentially annealed while restrained against dimensional change and crosslinking.

The disclosures of the foregoing U.S. patents to Mammino, Obayashi, Wallbillich, Thomsen and Evans are hereby incorporated by reference verbatim, with the same effect as though such disclosures were fully and completely set forth herein.

Moreover, the above-identified commonly-assigned co-pending application Ser. No. 08/721,418 to Edward L. Schlueter, Jr. et al., the disclosure of which earlier co-pending application is herein incorporated by reference, discloses producing an endless flexible belt using a punch and die. The disclosed punch and die have patterned edges in the form of a puzzle-cut pattern with extremely small nodes and kerfs. Moreover, the cutting tolerances of the patterned edges make it necessary to fix the punch with respect to the die so that there is no misalignment of the punch and the die between cutting operations.

While the above references disclose a variety of approaches to improve the seam of flexible belts, these disclosed approaches are either insufficient to meet the expectation, or often time introduce new set of undesirable outcomes. For example, puzzle-cut butt joined seam, based on intimate male-female puzzle pattern interlocking, though does provide a belt with a seam of nearly no additional thickness, however the seam is seen to pop open and separate when the butt joint puzzle-cut seam of the flexible imaging belt bends and flexes over small diameter belt support rollers, such as the 19 mm diameter roller, causing total seam separation. Attempts to apply a thin adhesive strip over the puzzle-cut seam joint to permanently secure the joint and resolve the seam bending induced popping problem has been successfully demonstrated, but the application of the adhesion does add significant thickness to the resulting puzzle-cut seam to thereby diminish the practical value of the seam.

Therefore, there is a need for an improved method for fabricating a flexible imaging member belt with a puzzle-cut seam having nil or reduced seam thickness.

DETAILED DESCRIPTION OF THE PREFERRED EMBODIMENTS

Therefore, it is an object of the present invention to provide a method for fabricating an improved flexible electrostatographic imaging member belt which overcomes the above-noted deficiencies.

It is another object of the present invention to provide a process for flexible electrostatographic imaging member belt puzzle-cut seam joint treatment which yields a thinner seam morphology as well as improving its mechanical seam strength.

It is still another object of the present invention to provide a process for flexible electrostatographic imaging member belt puzzle-cut seam treatment which eliminates the need of an adhesion strip, yields a seam of nil thickness, and is free of fatigue belt bending induced seam popping/separation problem when the electrostatographic imaging member belt flexes over small diameter belt module support rollers during cycling belt function.

It is a further object of the present invention to provide a method for fabricating an improved flexible electrostatographic imaging member belt having a mechanically robust puzzle-cut seam and exhibiting good circumferential dimension tolerance as well as wrinkle free in the seam region.

It is a still further object of the present invention to provide a method for fabricating an improved flexible electrostatographic imaging member belt having a thin puzzle-cut seam and free of wrinkles in the region of the seam.

Figure 1:
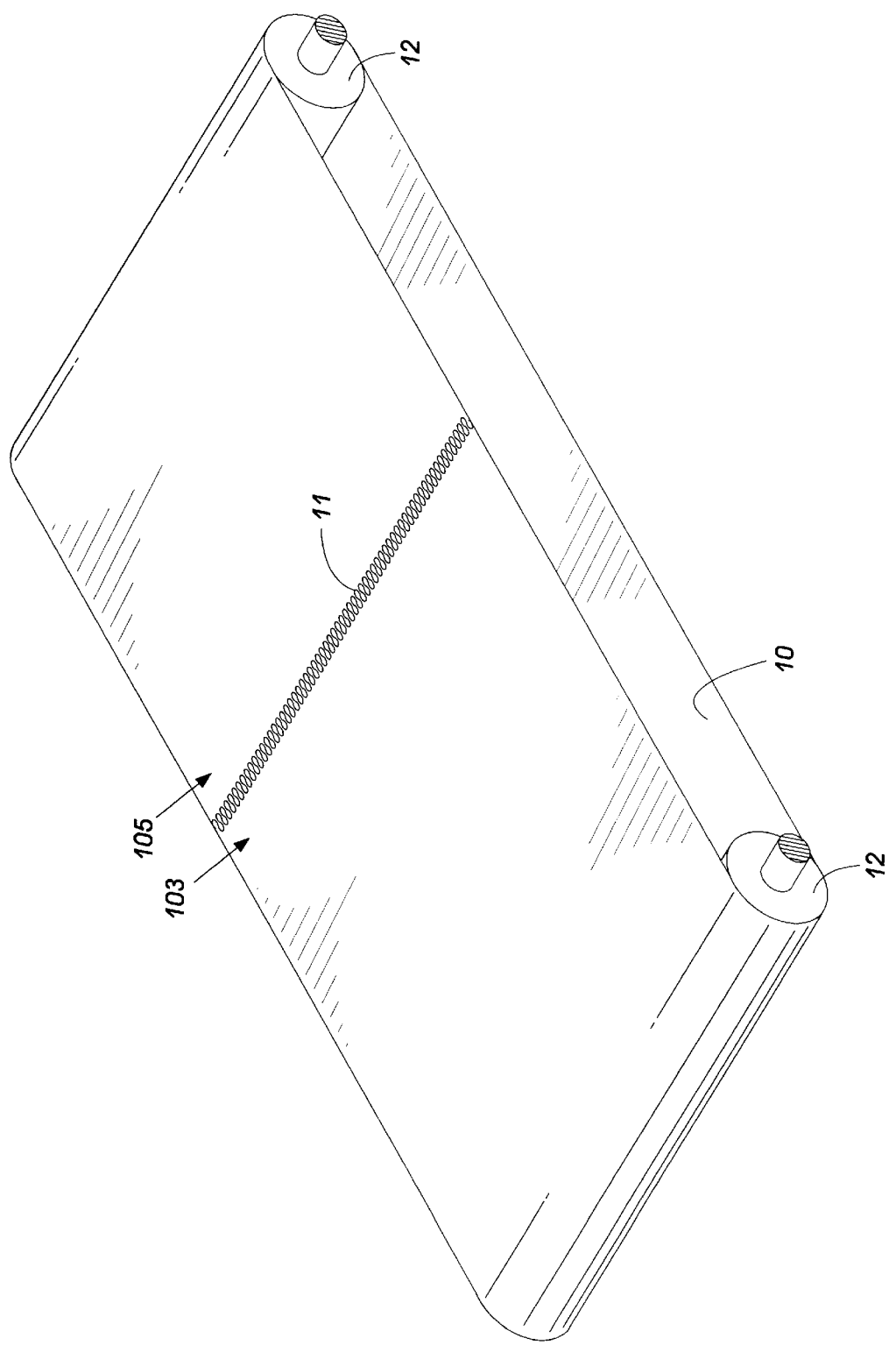
FIG. 1 shows a flexible belt 10 with a puzzle-cut seam 11 fabricated in accordance with the present invention.

Referring now to FIG. 1, there is shown a flexible imaging member belt 10 with a first end 103 and a second end 105, the two ends 103 and 105 being joined by a puzzle-cut seam 11 fabricated in accordance with the present invention. As shown, the length of flexible belt 10 extending between the two ends 103 and 105 is mounted on rollers 12. A drawing similar to FIG. 1 may be found in Lucille M. Sharf, Edward L. Schlueter, Jr., et al., "Puzzle cut seamed belt with bonding between adjacent surfaces by UV cured adhesive," U.S. Pat. No. 5,487,707, issued Jan. 30, 1996, the disclosure of which U.S. patent is hereby incorporated by reference verbatim, with the same effect as though such disclosure were fully and completely set forth herein. It is noted that the same Edward L. Schlueter, Jr. is a named inventor both in the foregoing U.S. Pat. No. 5,487,707 and in the present application.

Figure 1A:
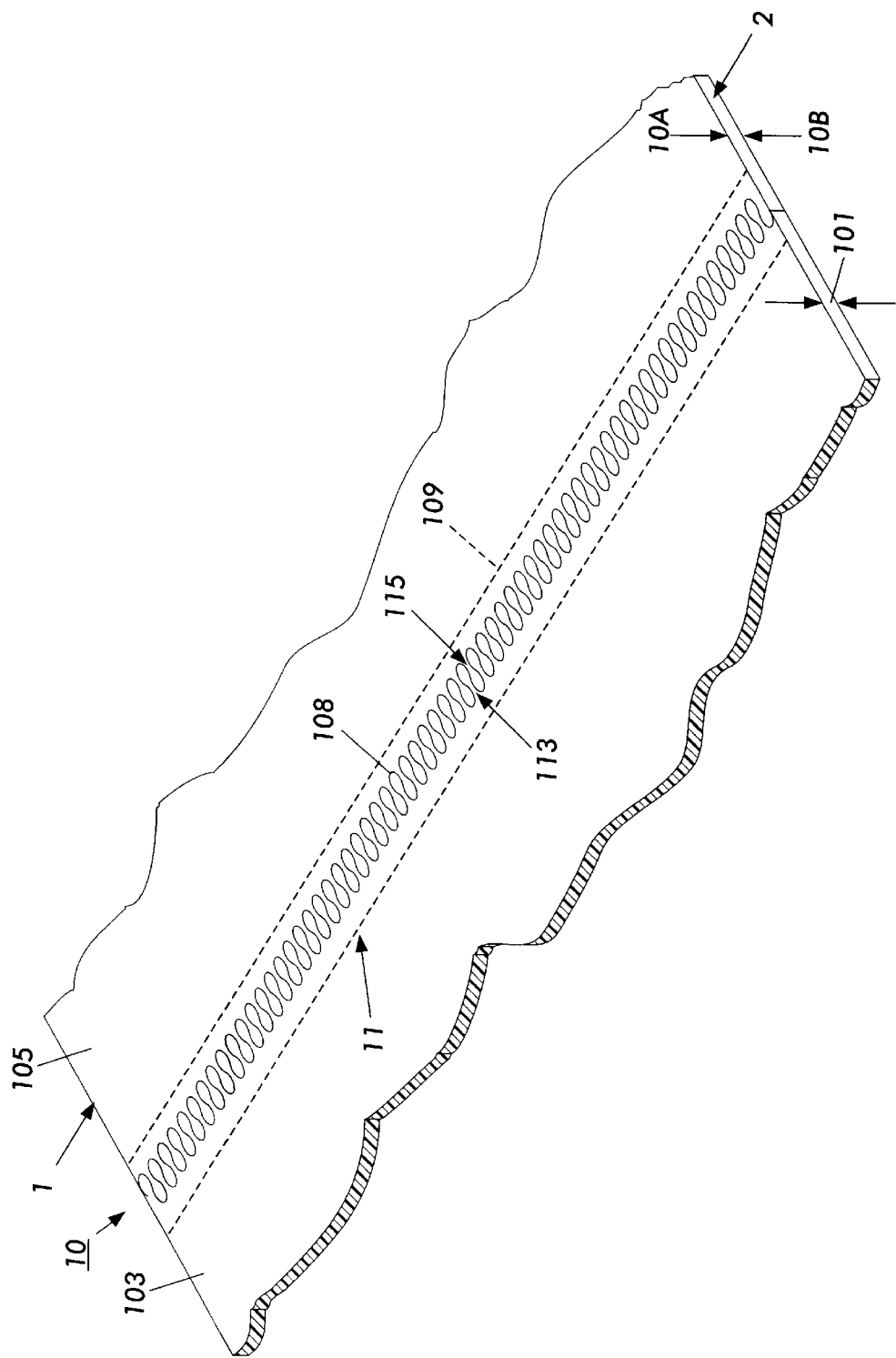
FIG. 1A shows the belt 10 and puzzle-cut seam 11 in greater detail.

FIG. 1A shows greater detail of a specific segment of the flexible belt 10, particularly including the vicinity of the seam 11. As shown therein, flexible belt 10 comprises parallel edges 1–2 and the seam 11 extending from one edge to the other edge, the belt seam 11 including a seam region including a puzzle-cut butt joint with an applied adhesive strip 109 over the seam joint, the adhesive strip comprising a thermoplastic polymer material having a fusing temperature.

Still referring to FIG. 1A, the flexible belt 10 has an outer belt surface 10A, an inner belt surface 10B, a first end 103 terminating in a first puzzle-cut pattern of fingers 113, and a second end 105 terminating in a matching second puzzle-cut pattern of fingers 115. As shown, the first and second puzzle-cut patterns of fingers 113 and 115 are arranged to mutually mate or join with each other.

It is noted that the present invention's fingers 113 and 115 correspond to the "nodes" of the earlier commonly-assigned co-pending application Ser. No. 08/721,418 to the present Edward L. Schlueter, Jr. et al, the disclosure of which earlier application is herein incorporated by reference.

Figure 1B:
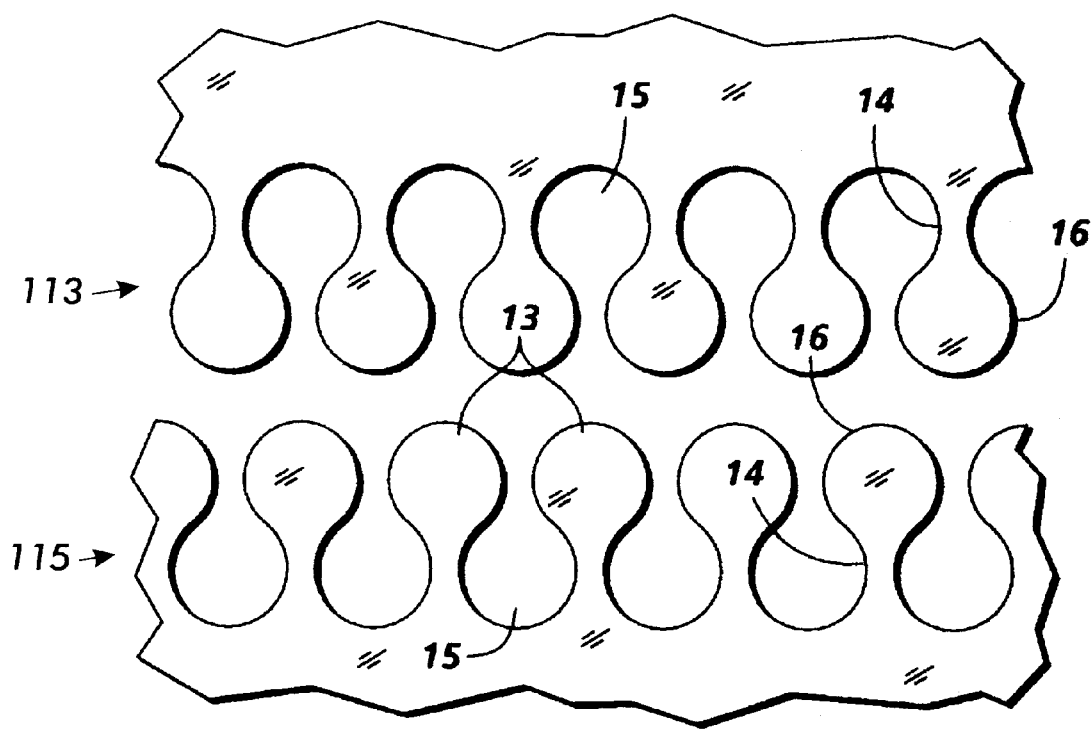
FIG. 1B is an enlarged view of the FIG. 1 puzzle-cut seam 11 pattern used on both joining belt ends 103 and 105 of the belt material to provide interlocking fingers each having a neck portion 14 attached to a larger head portion 16.

Referring now to FIG. 1B, there is an enlarged view of the first puzzle-cut pattern of fingers 113 and the second puzzle-cut pattern of fingers 115 used to join the belt 10 material first end 103 and second end 105. As shown, each of the first puzzle-cut pattern of fingers 113 and the second puzzle-cut pattern of fingers 115 comprises a series of necks 14 attached to corresponding heads 16 arranged to form male 13 and female 15 interlocking portions.

As discussed in greater detail below, in one embodiment, the first puzzle-cut pattern of fingers 113 comprises a series of alternating fingers, each finger forming a neck 14 and an attached head 16, the head diameter greater than the neck width, the head diameter from 0.1012 mm to 1.0160 mm, and the second puzzle-cut pattern of fingers 115 comprises a series of alternating fingers, each finger forming a neck 14 and an attached head 16, the head diameter greater than the neck width, the head diameter from 0.1012 mm to 1.0160 mm, such that the first and second puzzle-cut patterns of fingers are able to mate to form an endless belt 10.

The following is a discussion of the interrelationship among the various belt 10 and material parameters involved in the mechanical integrity of the seam 11. The mechanical integrity of the seam 11 was examined and analyzed for a number of configurations and in particular for the preferred configuration which involves finger heads forming parts of a circle and interconnecting via a neck on the opposite side. To determine the deflection under loading conditions, each such finger is treated as a beam fixed at the narrowest part of the neck joining the finger to the base and the deflection of each finger (head and attached neck) is calculated in terms of the orientation of the load relative to the beam. To assure that the seam 11 will not come apart under load, it is imposed that the maximum deflection of each finger, when the load, under worse conditions, is normal to the beam, would not exceed the thickness of the belt itself. Clearly, if the deflection of the finger is in excess of the thickness of the belt 10, then the seam will come apart. Under the above brief analysis, a master relationship connecting a material parameter M typical of the configuration with a geometric parameter G such that the belt 10 will not come apart under loading is expressed by the following Equation (1):

$$M = \frac{1-G}{\left(1+\sqrt{4-\frac{1}{G^2}}\right)^3}$$

In this relationship M is a dimensionless quantity given by the following Equation (2):

$$M = \frac{4NR^3}{Et^4} \quad (2)$$

and G represents the ratio as expressed by the following Equation (3):

$$G = 2R/W \quad (3)$$

where N is the total load per unit width (i.e., lbs./in.) acting on the belt, E is the modulus of elasticity of the belt material t, the thickness of the belt, R the radius of the circular head forming the seam, and W is the wave length of one whole period between two adjacent fingers. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying Equation (1), by virtue of the fact that there is an infinite number of combinations of the variables involved in that particular pair of values of M and G. Inspection of the geometry of the finger shows that the structure is characterized by two main features: the shoulder, or that portion where there is interference between adjacent fingers, which supports the seam, and the neck of each finger which represents its strength under loading. The size of the shoulder should be sufficient to insure mechanical integrity of the seam without making the neck too small as to weaken its strength.

Figure 1C:
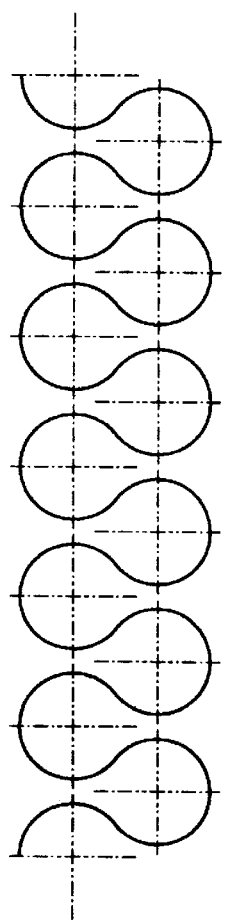
FIGS. 1C, 1D and 1E are three possible representations of the FIG. 1 puzzle-cut configuration.
Figure 1D:
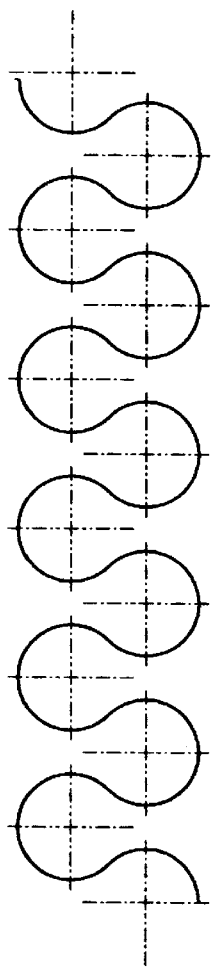
Figure 1E:
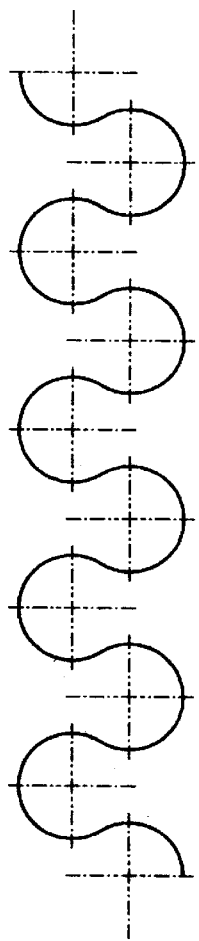

In this regard attention is directed to FIGS. 1C, 1D and 1E wherein it can be visually observed that the size of the neck in FIG. 1C is too small and the size of the shoulder in FIG. 1E does not provide sufficient interference contact while the geometry in FIG. 1D appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the finger is zero and the finger has no strength. Once either M or G is known the entire configuration becomes determinate with the help of the above Equations (1), (2) and (3) and other standard geometric relationships. Measurements on actual belts have generally confirmed the above analysis.

To illustrate the solution methodology, suppose a belt material of Young's modulus E=500,000 p.s.i. and thickness t=0.004 inch is subjected to a tension N=2.0 lb./in. of belt width. H is the perpendicular height between centers of one finger on one side of the seam and an adjacent finger on the opposite side of the seam. The solution possibilities are given in Table 1 below such that the seam will not come apart. If a value G=0.6 is chosen as a compromise between seam integrity and finger strength, we find

TABLE 1

| Head Diameter, Period, Neck Width, Finger Height, | | | D = 0.448 mm W = 0.747 mm g = 0.299 mm H = 0.69696 | | |
|---|---|---|---|---|---|
| G | 1/M | D | W | g | H |
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |

TABLE 1-continued

| Head Diameter, | | D = 0.448 mm | | | |
| Period, | | W = 0.747 mm | | | |
| Neck Width, | | g = 0.299 mm | | | |
| Finger Height, | | H = 0.69696 | | | |
| G | 1/M | D | W | g | H |
| --- | --- | --- | --- | --- | --- |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |
| .9800 | 1006.3020 | .1277 | .1303 | .0026 | .2376 |
| .9900 | 2026.1140 | .1012 | .1022 | .0010 | .1885 |

N, lb./in. = 2.0
E, p.s.i. = 500,000
t, in. = 0.004

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

With reference to the embodiment illustrated in FIG. 1B, the seam may be typically of the order of one inch wide on a belt which is 16 to 18 inches long depending on roll diameter, material modulus or other parameters and the post and head pattern may be formed from a male/female punch cut with each end being cut separately and subsequently being joined to form the seam with a roller similar to that used as a wall paper seamer rolled over the seam by hand to complete the interlocking nature of the puzzle cut pattern.

The two ends of the belt material are joined by physically placing them together in interlocking relationship. This may require the application of pressure to properly seat or mate the interlocking elements.

Thus, referring generally to FIGS. 1A and 1B, the belt 10 ends 103 and 105 are joined by means of mating puzzle-cut patterns of fingers 113 and 115 together. As a result of this joining, the now-mated first and second patterns of fingers 113 and 115 form a juncture 108, which provides strong mechanical interlocking after mating to form an endless belt 10.

Next, in accordance with the invention, an adhesive strip 109 is applied over the juncture 108.

Figure 2:
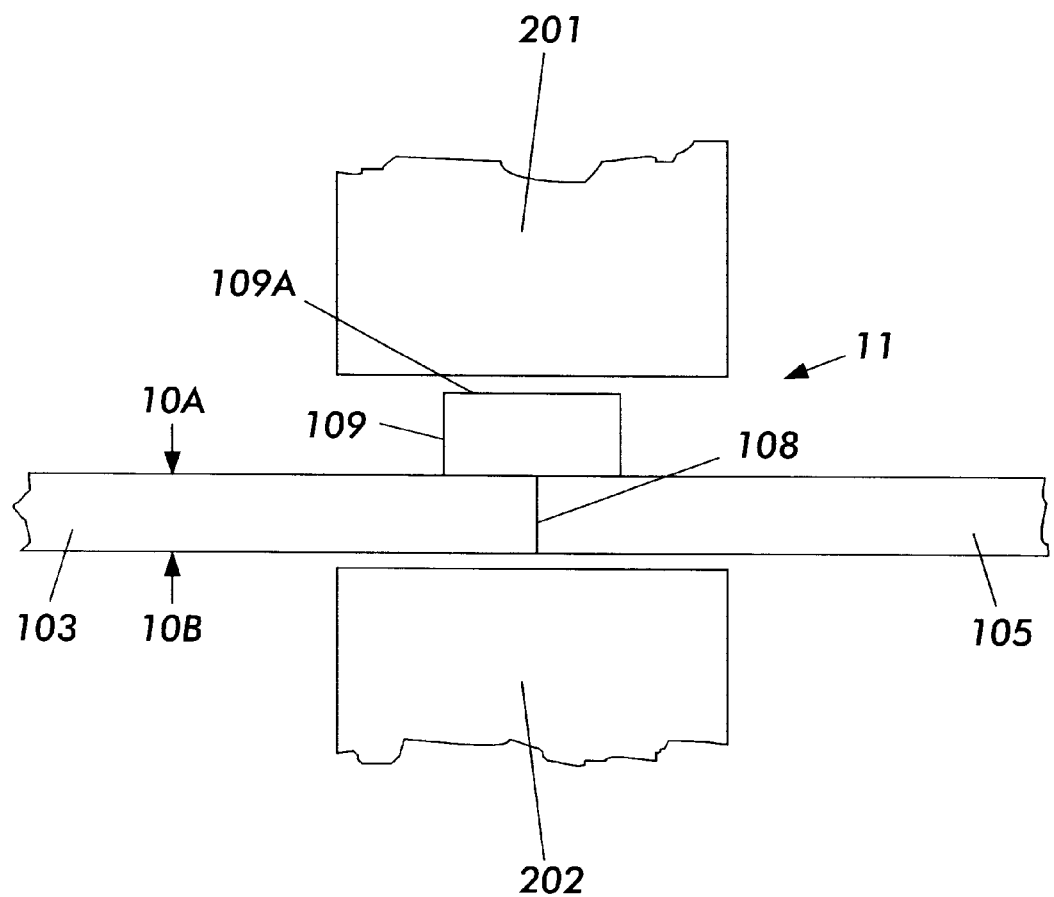
FIG. 2 shows a cross-sectional profile of a narrow adhesive strip application over seam 11 of the belt 10 and apparatus 201–202 suitable for demonstrating one embodiment of the present invention.
Figure 3:
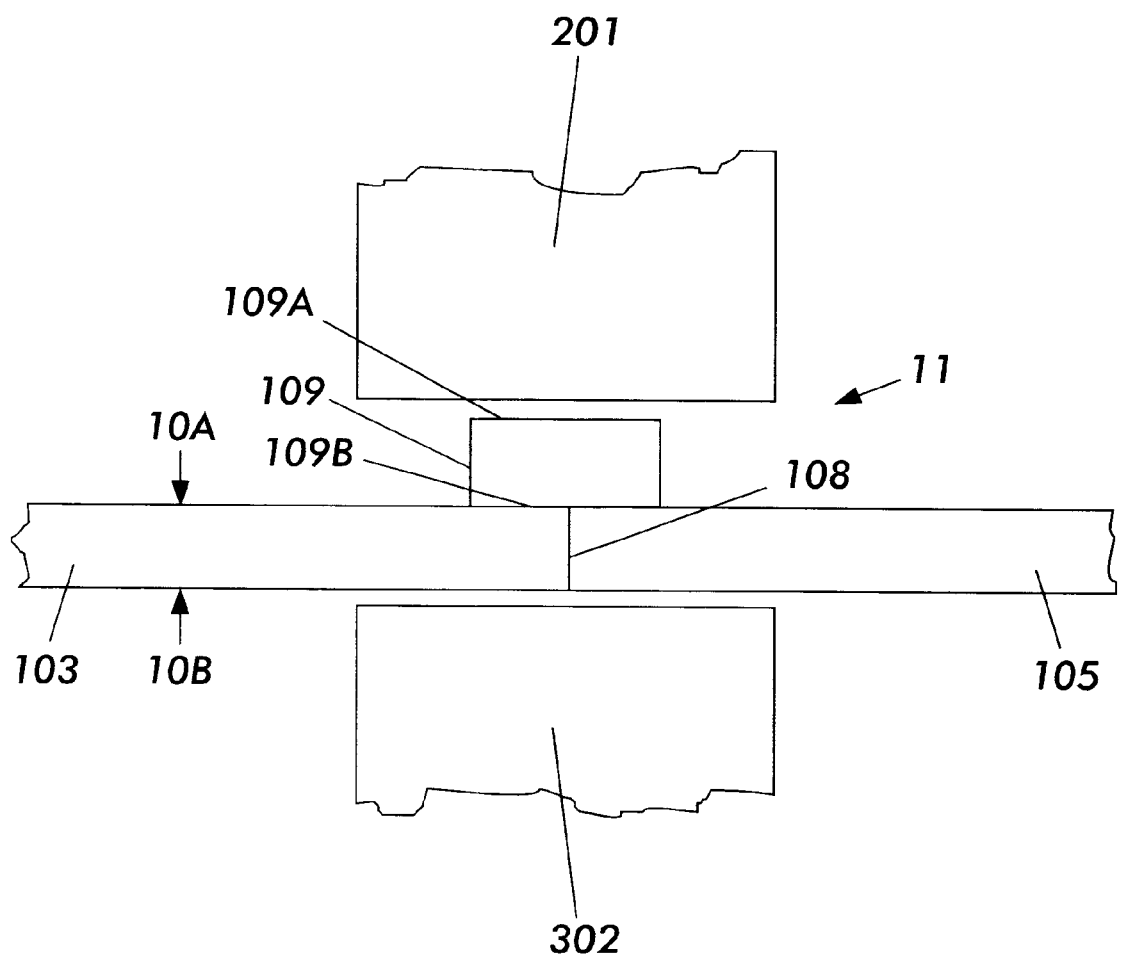
FIG. 3 shows a cross-sectional profile of a narrow adhesive strip application over seam 11 of the belt 10 and apparatus 201–302 suitable for demonstrating a further embodiment of the present invention.

Subsequent steps of the invention are depicted in FIGS. 2–3.

Referring now to FIG. 2, there is shown a cross-sectional profile of the belt 10 together with apparatus 201–202 suitable for demonstrating one embodiment of the present invention. As shown, the adhesive strip 109 (a thermally activated material) is applied onto the outer belt surface 10A to only sufficiently enough cover the juncture 108. The adhesive strip 109 comprises an adhesive surface 109A. There is also shown two elements 201–202, the first element 201 comprising a compressing and heating element, and the second element 202 comprising a compressing element.

In accordance with the invention, the compressing and heating element 201 applies a first force to the adhesive surface 109A while, simultaneously, the compressing element 202 applies an equal but opposing second force to the inner belt surface 10B of the belt 10 at an area proximate to the juncture 108. As a result of the foregoing opposing first and second forces, adhesive surface 109A and part of inner belt surface 10B near the juncture 108 are compressed together. While elements 201 and 202 continue to actively apply the foregoing compressing forces, the following events occur, in sequence:

First, compression and heating element 201 applies heat directly to the adhesive surface 109A to heat up and soften or melt the adhesive strip 109 for a fixed heating period causing the adhesive material to flow into and fill the crevice between the mating first and second puzzle-cut patterns of fingers 113 and 115 and bond the interfaces of these fingers 113 and 115, as well as promoting the adhesive to stick to the outer belt surface 10A at the juncture 108.

Second, after the above heating period, compressing and heating element 201 cools the adhesive strip 109 for a fixed cooling period.

Third, after the above fixed cooling period, a processor (not shown) determines when a puzzle-cut seam 11 resulting from the foregoing compressing, heating, and cooling applied to adhesive strip 109 is satisfactory.

If the puzzle-cut seam 11 is determined to be satisfactory, then elements 201 and 202 cease to apply the foregoing compressing forces, and the process of fabricating a flexible belt with a puzzle-cut seam is done.

Otherwise, if the puzzle-cut seam 11 is determined to be not satisfactory, then elements 201 and 202 will continue the processing cycle again, to apply the foregoing compressing forces, while the above heating, cooling, and determining steps repeat until the determining step determines that the puzzle-cut seam 11 is satisfactory. As above, once the puzzle-cut seam 11 is determined to be satisfactory, then elements 201 and 202 cease to apply the foregoing compressing forces, and the process of fabricating a flexible belt with a puzzle-cut seam is done. When the puzzle-cut seam treatment process needs multiple heat/cooling cycles to reach a satisfactory result, the cumulative treatment time is required, from effective belt production cost consideration, not to exceed 30 seconds.

In one embodiment, the above determining step includes a step of determining the total heating period during which the adhesive strip 109 has been heated.

In one embodiment of FIG. 2, the compressing pressure applied to adhesive strip 109 is between about 40 pounds per square inch and about 80 pounds per square inch.

In one embodiment of FIG. 2, the heat applied to adhesive strip 109 is at a temperature of between about 70 degrees Celsius, which is equivalent to 158 degrees Fahrenheit, and about 100 degrees Celsius, which is equivalent to 212 degrees Fahrenheit.

In one embodiment of FIG. 2, the total heating period during which adhesive strip 109 is heated is at the desired temperature of between about 5 seconds and 25 seconds.

In one embodiment of FIG. 2, the adhesive strip 109 has a width that is sized to only sufficiently enough cover the juncture 108. In one embodiment, the width is approximately ranging from about 1 millimeter to about 10 millimeters.

In one embodiment, the cooling step is accomplished by cooling the compressing and heating element 201 with a cooling fluid.

In one embodiment, the cooling fluid is water.

In one embodiment, the flexible belt 10 comprises a photoreceptor belt.

In another embodiment, the flexible belt 10 comprises an electroreceptor belt.

In still another embodiment, the flexible belt 10 comprises an intermediate image transfer belt.

Referring now to FIG. 3, there is shown a profile of the belt 10 together with apparatus 201 and 302 suitable for demonstrating a further embodiment of the present invention.

Similar to the prior embodiment described immediately above, the adhesive strip 109 is applied onto the outer belt surface 10A to only sufficiently enough cover the juncture 108, the adhesive strip 109 comprising an adhesive surface 109A. Element 201 comprises a first compressing and heating element. As well, element 302 comprises a second compressing and heating element.

After the adhesive strip 109 has been applied to the outer belt surface 10A, the first compressing and heating element 201 applies a first force to the adhesive surface 109A while, simultaneously, the second compressing and heating element 302 applies a second force to the inner belt surface 10B at a point proximate to the juncture 108. As a result of the foregoing first and second forces, adhesive surface 109A and part of inner belt surface 10B near the juncture 108 are compressed together. Simultaneously while elements 201 and 302 continue to actively maintain the foregoing compressing forces, the following events occur in sequence:

The first compressing and heating element 201 applies heat directly to the adhesive surface 109A while, simultaneously, the second compressing and heating element 302 applies heat directly to the junction 108 and, in turn, to the bottom surface 109B of the adhesive strip 109, the combined heating provided by elements 201 and 302 thus heating the adhesive strip 109 for a fixed heating period.

After the above heating period, the first compressing and heating element 201 directly cools the adhesive surface 109A while, simultaneously, the second compressing and heating element 302 directly cools the junction 108 and, in turn, the bottom surface 109B of the adhesive strip 109, the combined cooling provided by elements 201 and 302 thus cooling the adhesive strip 109 for a fixed cooling period.

After the above fixed cooling period, a processor (not shown) determines when a puzzle-cut seam 11 resulting from the foregoing compressing, heating, and cooling applied to adhesive strip 109 is satisfactory.

If the puzzle-cut seam 11 is determined to be satisfactory, then elements 201 and 302 cease to apply the foregoing compressing forces, and the process of fabricating a flexible belt with a puzzle-cut seam is done.

Otherwise, if the puzzle-cut seam 11 is not determined to be satisfactory, then elements 201 and 202 will continue the processing cycle to apply the foregoing compressing forces, while the above heating, cooling, and determining steps repeat until the determining step determines that the puzzle-cut seam 11 is satisfactory. As above, once the puzzle-cut seam 11 is determined to be satisfactory, then elements 201 and 202 cease to apply the foregoing compressing forces, and the process of fabricating a flexible belt with a puzzle-cut seam is done.

In the FIG. 3 embodiment, compression and heating by elements 201 and 302 result in heating and softening or melting the adhesive strip 109 for a fixed heating period causing the adhesive material to flow into and fill the crevice between the mating fingers and bond the interfaces of these fingers, as well as promoting the adhesive to stick to the outer belt surface 10A at the juncture 108.

In one embodiment, the above determining step includes a step of determining the total heating period during which the adhesive strip 109 has been heated by the compressing and heating element 201.

In one embodiment of FIG. 3, the compressing pressure applied to adhesive strip 109 is between about 40 pounds per square inch and about 80 pounds per square inch.

In one embodiment of FIG. 3, the heat applied to adhesive strip 109 is at a temperature of between about 70 degrees Celsius, which is equivalent to 158 degrees Fahrenheit, and about 100 degrees Celsius, which is equivalent to 212 degrees Fahrenheit.

In one embodiment of FIG. 3, the total heating period during which adhesive strip 109 is heated at a selected temperature is between about 5 seconds and about 25 seconds.

In one embodiment of FIG. 3, the adhesive strip 109 has a width that is sized to only sufficiently enough cover the juncture 108. In one embodiment, the width is approximately in a range of from about 1 millimeter to about 10 millimeters.

In one embodiment, the cooling step is accomplished by cooling the compressing and heating elements 201 and 302 with a cooling fluid.

In one embodiment, the cooling fluid is water.

In one embodiment, the flexible belt 10 comprises a photoreceptor belt.

In another embodiment, the flexible belt 10 comprises an electroreceptor belt.

In still another embodiment, the flexible belt 10 comprises an intermediate image transfer belt.

After performing the process based on FIG. 2 or FIG. 3, in one embodiment, a mechanical polishing step is performed to remove the adhesive from the outer belt surface 10A and smooth out the seam profile, thus achieving nil differential seam thickness in the treated puzzle-cut seam. In this embodiment, it will be understood that, while adhesive material is removed from the outer belt surface 10A to achieve the nil differential seam thickness, there substantially remains that portion of the adhesive material that has previously flowed into and filled the crevice between the mating first and second puzzle-cut patterns of fingers 113 and 115 and bonded to the interfaces of these fingers 113 and 115.

Figure 4:
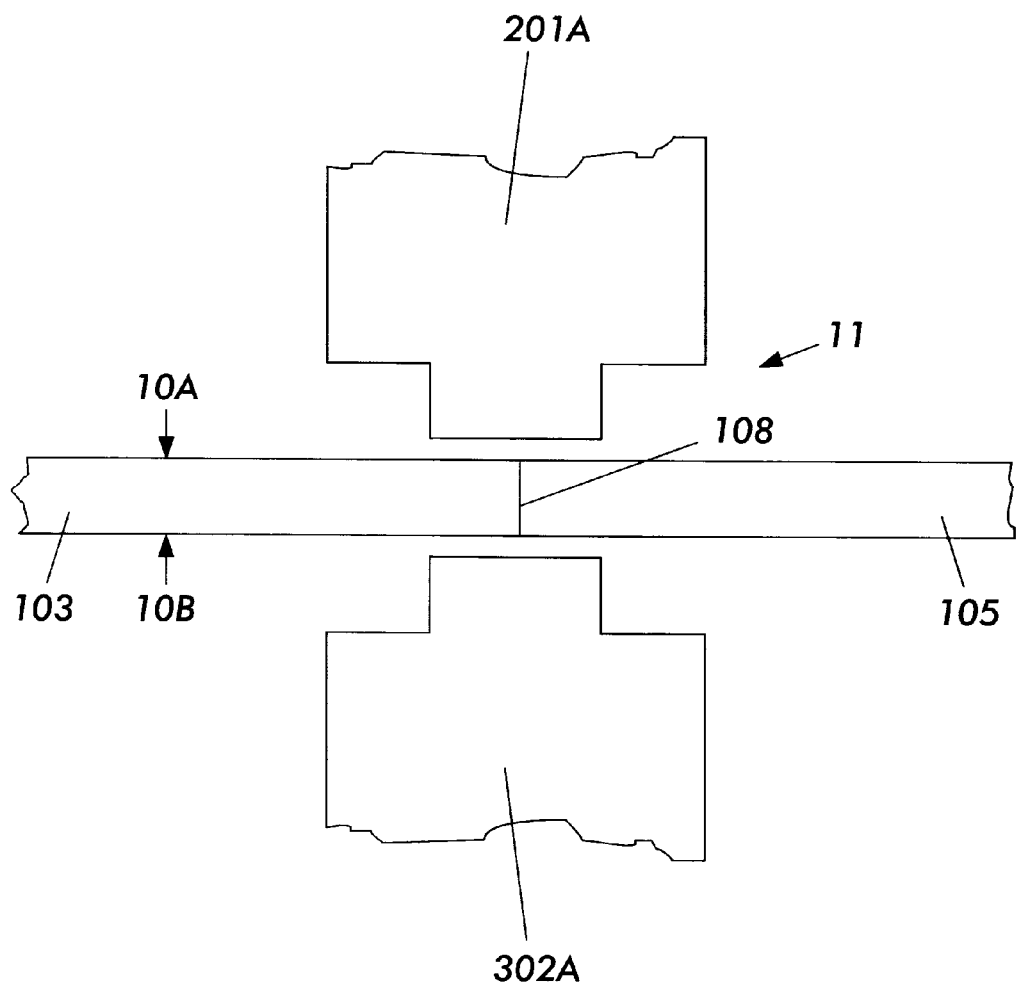
FIG. 4 shows a cross-sectional profile of seam 11 of belt 10 and apparatus 201A–302A suitable for demonstrating a still further embodiment of the present invention.

Referring now to FIG. 4, there is shown a still further embodiment of the present invention. As shown, the puzzle-cut seam 11 is subjected to the compression/heating treatment process of elements of 201A and 302A in the same manners as that described in FIG. 3, with the exception that the adhesive strip 109 is not required and both the compression/heating elements 201A and 302A are reduced in cross-sectional area to have a width only sufficiently enough to cover juncture 108. For good understanding, the basic difference between elements 201A and 302A in FIG. 4 and the corresponding elements 201 and 302 in FIG. 3 is their respective shapes.

In the FIG. 4 embodiment, compression and heating by elements 201A and 302A result in heating and softening the belt 10 thermoplastic material to cause contacting surface areas of the first and second puzzle-cut patterns of fingers 113 and 115 to fuse together to form the puzzle-cut seam 11.

In one embodiment of FIG. 4, the compressing pressure applied to form seam 11 is between about 70 pounds per square inch and about 120 pounds per square inch. In one embodiment of FIG. 4, the heat applied to form seam 11 is at a temperature of between about 160 degrees Celsius, which is equivalent to 320 degrees Fahrenheit, and about 240 degrees Celsius, which is equivalent to 464 degrees Fahrenheit.

In one embodiment of FIG. 4, the total heating period required to form seam 11, at the selected temperature, is between about 1 second and about 7 seconds.

Figure 5:
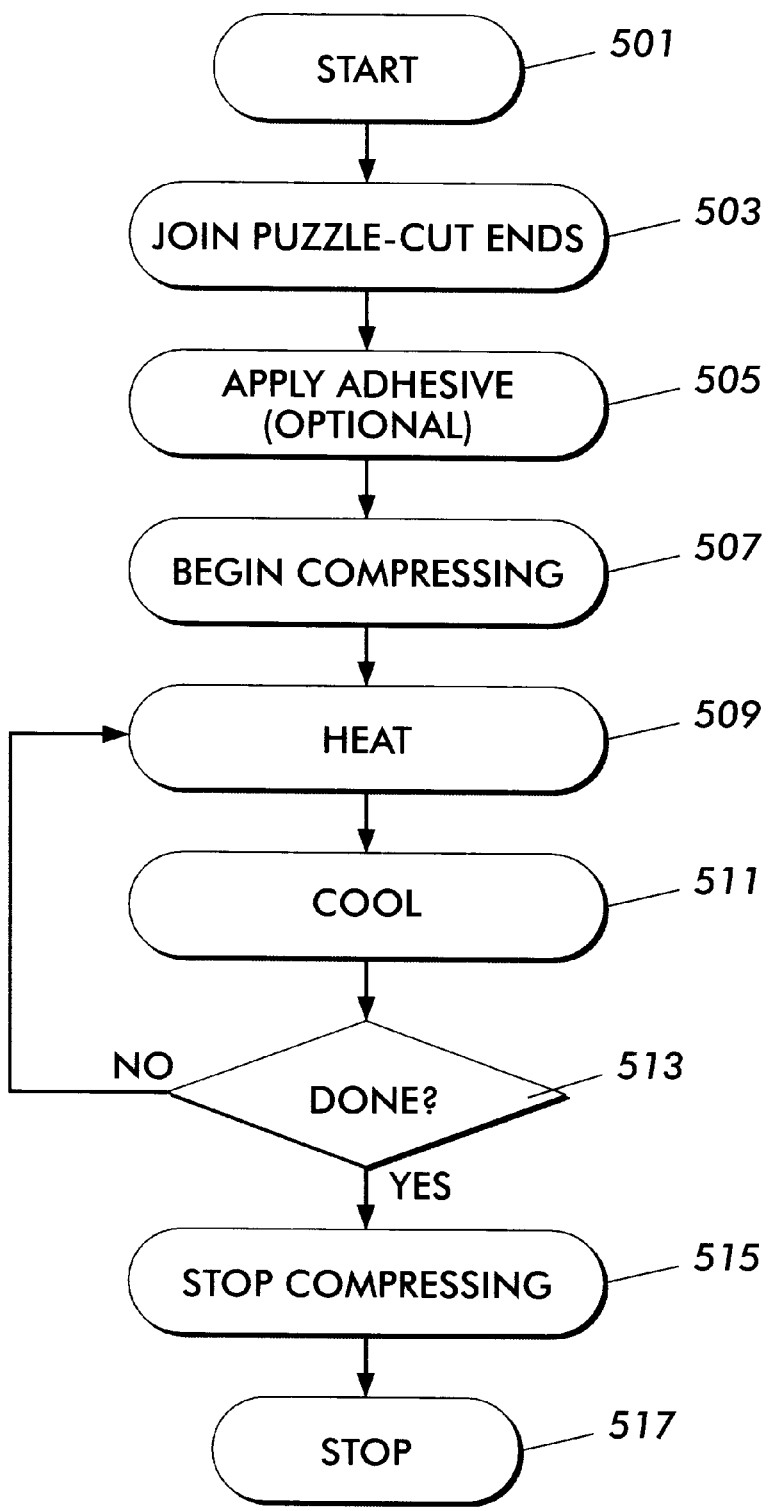
FIG. 5 is a flow diagram of the invention.

Referring now to FIG. 5, there is shown a flow diagram of the present invention and the seam treatment process is carried out according to the steps below.

The steps of FIG. 5 will vary somewhat depending on which embodiment of the invention is being practiced.

The following first description is based on FIGS. 2 and 3.

After starting, step 501, the process goes to step 503.

In step 503, the first puzzle-cut pattern of fingers 113 and second puzzle-cut pattern of fingers 115 of belt 10 are joined to form the juncture 108. The process then goes to step 505.

In step 505, an adhesive strip 109 is applied on the outer belt surface 10A to substantially cover the juncture 108, the adhesive 109 layer comprising an adhesive surface 109A. The process next goes to step 507.

In step 507, the adhesive surface 109A and the inner belt surface 10B are compressed together at a point proximate to the juncture 108. In one embodiment, the step 507 compressing forces of are applied by the compressing and heating element 201 and the compressing element 202. In another embodiment, the step 507 compressing forces are applied by a first compressing and heating element 201 and a second compressing and heating element 302.

While the step 507 compressing forces continue to be applied, the process goes to step 509.

In step 509, the adhesive strip 109 is heated for a fixed heating period. In one embodiment, the step 509 heat is applied by means of compressing and heating element 201 applying heat to the adhesive surface 109A. In another embodiment, the step 509 heat is applied by means of compressing and heating element 201 applying heat to the adhesive surface 109A and, simultaneously, compressing and heating element 302 applying heat to the junction 108 and, in turn, to the bottom 109B of the adhesive strip 109. In either embodiment, the adhesive strip 109 becomes heated. While the step 507 compressing forces continue to be applied, the process goes to step 511.

In step 511, the adhesive strip 109 is cooled for a fixed cooling period. In one embodiment, the step 511 cooling is applied by means of compressing and heating element 201 cooling the adhesive surface 109A. In another embodiment, the step 511 cooling is applied by means of compressing and heating element 201 cooling the adhesive surface 109A and, simultaneously, compressing and heating element 302 cooling the junction 108 and, in turn, the bottom 109B of the adhesive strip 109. In either embodiment, the adhesive strip 109 becomes cooled. While the step 507 compressing forces continue to be applied, the process goes to step 513.

In step 513, it is determined when the puzzle-cut seam 11 formed as a result of the foregoing adhesive strip 109 applying step 505, compressing step 507, heating step 509 and cooling step 511 is satisfactory.

When determining step 513 determines that the puzzle-cut seam 11 is not satisfactory, the process returns to step 509, whereupon the heating step 509, cooling step 511, and determining step 513 are repeated.

Otherwise, when determining step 513 determines that the puzzle-cut seam 11 is satisfactory, the process goes to step 515.

In step 515, the compressing initially begun in the prior step 507 now ceases. The puzzle-cut seam 11 is now complete, and the process ends, step 517.

In one embodiment, the determining step 513 includes a step of determining a total (cumulative) period during which the adhesive strip 109 has been heated.

In accordance with the present invention, the physically interlocked butt joined puzzle-cut end 103 comprising the first puzzle-cut pattern of fingers 113 and the end 105 comprising the second puzzle-cut pattern of fingers 115 are processed into a boned seamed flexible imaging member belt 10, with puzzle-cut seamed joint 11.

In practice, the heating step 509 raises the temperature of the adhesive strip 109 in the joint region 108 to a temperature of from about 2–20 degrees Celsius, which is equivalent to 3.6–36 degrees Fahrenheit, above the fusing temperature of the thermoplastic polymer material that comprises the adhesive strip 109.

Also, the compressing step 507 combines with heating step 509 to flatten-out the adhesive strip 109, to eliminate protrusion spots in the adhesive strip 109, to reduce joint region thickness of the adhesive strip 109, as well as fusing the adhesive strip 109 to the juncture 108, thus resulting in a seamed flexible belt 10.

The meaning of fusing temperature of thermoplastic polymer material is defined here as an elevated temperature at which the thermoplastic polymer material at the belt juncture 108 is adequately softened to fuse into one continuous material matrix when subjected to the specific compressing force applied by step 507.

The following second description is based on FIG. 4.

After starting, step 501, the process goes to step 503.

In step 503, the first puzzle-cut pattern of fingers 113 and second puzzle-cut pattern of fingers 115 of belt 10 are joined to form the juncture 108. The process then omits step 505 and goes directly to step 507.

In step 507, the outer belt surface 10A and the inner belt surface 10B in the vicinity of the juncture 108 are compressed together.

Next, while the step 507 compressing forces continue, the process goes in sequence to steps 409, 411 and 413.

In step 509, the belt in the vicinity of the juncture 108 is heated for a fixed heating period.

In step 511, the belt in the vicinity of the juncture 108 is cooled for a fixed cooling period.

In step 513, it is determined when the puzzle-cut seam 11 formed as a result of the foregoing compressing step 507, heating step 509 and cooling step 511 is satisfactory.

When determining step 513 determines that the puzzle-cut seam 11 is not satisfactory, the process returns to step 509, whereupon the heating step 509, cooling step 511, and determining step 513 are repeated.

Otherwise, when determining step 513 determines that the puzzle-cut seam 11 is satisfactory, the process goes to step 515.

In step 515, the compressing initially begun in the prior step 507 now ceases. The puzzle-cut seam 11 is now complete, and the process ends, step 517.

In one embodiment, the determining step 513 includes a step of determining a total (cumulative) period during which the juncture 108 has been heated.

In summary, there is provided a method in accordance with FIG. 5 for fabricating a flexible belt 10 with a puzzle-cut seam 11, the flexible belt having an outer belt surface 10A, an inner belt surface 10B, a first end 103 terminating in a first puzzle-cut pattern of fingers 113, a second end 105 terminating in a matching second puzzle-cut pattern of fingers 115, a length therebetween, the first 113 and second 115 puzzle-cut patterns of fingers arranged to be joined together, the method comprising the steps of:

in step 503, joining the first and second puzzle-cut patterns of fingers to form a juncture 108;

in step 505, applying an adhesive strip 109 on the outer belt surface to cover the juncture, the adhesive strip comprising an adhesive surface 109A;

in step 507, compressing the adhesive surface 109A and the inner belt surface 10B together at a point proximate to the juncture 108 and, while compressing:

in step 509, heating the adhesive strip 109 for a fixed heating period;

in step 511, cooling the adhesive strip 109 for a fixed cooling period; and in step 513, determining when the puzzle-cut seam 11 formed by the foregoing joining, applying, compressing, heating and cooling steps is satisfactory.

Also, there is provided method in accordance with FIG. 5 for fabricating a flexible belt 10 with a puzzle-cut seam 11, the flexible belt having an outer belt surface 10A, an inner belt surface 10B, a first end 103 terminating in a first puzzle-cut pattern of fingers 113, a second end 105 terminating in a matching second puzzle-cut pattern of fingers 115, a length therebetween, the first 113 and second 115 puzzle-cut patterns of fingers arranged to be joined together, the method comprising the steps of:

in step 503, joining the first and second puzzle-cut patterns of fingers to form a juncture 108;

in step 507, compressing the outer belt surface 10A and the inner belt surface 10B together in the vicinity of the juncture 108 and, while compressing:

in step 509, heating the belt 10 in the vicinity of the juncture 108 for a fixed heating period;

in step 511, cooling the belt 10 in the vicinity of the juncture 108 for a fixed cooling period; and in step 513, determining when the puzzle-cut seam 11 formed by the foregoing joining, compressing, heating and cooling steps is satisfactory.

In one embodiment, the equipment used to practice the present invention comprises an impulse heat sealing machine.

In one embodiment, the resulting puzzle-cut seam 11 is mechanically polished to remove the excess adhesive from the seam region surface to yield a resulting puzzle-cut seam joint having no added thickness. In one embodiment, polishing is done by applying abrasives to the joint surface.

The FIG. 5 process results in a seamed flexible belt of nil seam thickness and free of belt ripples at the vicinity of the puzzle-cut seam joint. It will be understood that the FIG. 5 adhesive applying step 505 is performed when the invention is practiced based on FIGS. 2 or 3, but omitted when the invention is practiced based on FIG. 4.

In all embodiments of the invention, the compression, heating, and cooling cycles should be completed in less than 30 seconds based on effective belt production cost consideration as well as to yield good physical/mechanical and seam morphological results.

Further, there is provided a process for flexible electrostatographic imaging member belt puzzle-cut seam joint treatment which yields a thinner seam morphology as well as improving its mechanical seam strength.

Also, there is provided a process for flexible electrostatographic imaging member belt puzzle-cut seam treatment which eliminates the need of an adhesion strip, yields a seam of nil thickness, and is free of fatigue belt bending induced seam popping and separation problem when the electrostatographic imaging member belt flexes over small diameter belt module support rollers during cycling belt function.

Moreover, there is provided a method for fabricating an improved flexible electrostatographic imaging member belt having a mechanically robust welded seam and exhibiting good circumferential dimension tolerance as well as wrinkle free in the seam region.

Also, there is provided a method for fabricating an improved electrostatographic imaging member belt having a thin puzzle-cut seam and no wrinkles in the region of the seam.

Referring again to FIGS. 2–3, with cross-reference to FIG. 5, there is depicted in FIGS. 2–3 the flexible belt 10 wherein the first belt end 103 and the second belt end 105 have been joined to form a juncture 108, such belt-end joining being depicted in FIG. 5 as step 503 and described in the originally-filed specification at page 10, lines 29–31; page 16, lines 7–8; and page 19, lines 5–6.

Still referring to FIGS. 2–3, with cross-reference to FIG. 5, there is depicted in FIGS. 2–3 only a single (1) adhesive strip 109 that has been applied directly to the outer belt surface 10A of the first and second belt ends 103–105 to cover the juncture 108, such adhesive strip 109 applying being depicted in FIG. 5 as step 505 and described in the originally-filed specification at page 11, lines 1–2; page 16, lines 9–11; and page 19, lines 7–8.

Still referring to FIGS. 2–3, there is no depiction therein of any adhesive strip being applied to the inner belt surface 10B.

Also, referring generally to the disclosure of the originally-filed specification, including the drawing thereof, there likewise is no disclosure of any adhesive strip being applied to the inner belt surface 10B.

As a result of the foregoing, therefore, those of ordinary skill in the art will understand that, at a time prior to both the following A–B:

A. The above step 503 of joining the first belt end 103 and the second belt end 105 (the first and second belt ends 103–105 comprising the first and second puzzle-cut patterns of fingers 113–115) to thereby form the juncture 108; and B. The above step 505 of applying such adhesive strip 109 directly to the outer belt surface 10A;

then, at such time, both the outer belt surface 10A and the inner belt surface 10B are devoid of any adhesive material.

While various embodiments of a method for fabricating a flexible belt with a puzzle-cut seam, in accordance with the present invention, have been disclosed hereinabove, the scope of the invention is defined by the following claims.

What is claimed is:

1. A method for fabricating a flexible belt with a puzzle-cut seam, the flexible belt having an outer belt surface, an inner belt surface, a first end terminating in a first puzzle-cut pattern of fingers, a second end terminating in a matching second puzzle-cut pattern of fingers, a length therebetween, the first and second puzzle-cut patterns of fingers arranged to be mated and joined together, the method comprising the steps of:

first, join the first and second puzzle-cut patterns of fingers to form a juncture;

second, apply an adhesive strip comprising thermally-activated adhesive material directly to the outer belt surface to cover the juncture, the adhesive strip comprising an adhesive surface, such that the adhesive strip directly contacts the outer belt surface;

third, simultaneously compress both the adhesive surface of the adhesive strip on the outer belt surface and the inner belt surface together at a point proximate to the juncture and, while compressing, perform the following fourth, fifth and sixth steps:

fourth, apply heat directly to the adhesive surface of the adhesive strip for a fixed heating period to melt the adhesive material and fill a crevice between the mated fingers with the melted adhesive material;

fifth, cool the adhesive strip for a fixed cooling period; and subsequent to the foregoing fixed cooling period, sixth, determine when a puzzle-cut seam formed by the foregoing joining, applying, compressing, heating and cooling steps is satisfactory;

wherein the above first, second, third, fourth, fifth and sixth steps are performed in sequence and wherein, prior to both said first step of joining the first and second puzzle-cut patterns of fingers to form a juncture and said second step of applying said adhesive strip directly to the outer belt surface, both said outer belt surface and said inner belt surface are devoid of adhesive material.

2. The method of claim 1 where the adhesive strip has an adhesive strip width that is sized to only sufficiently enough cover the juncture.

3. The method of claim 1, where the adhesive strip width is approximately between 1 and 10 millimeters.

4. The method of claim 1, where the compressing step comprises a pressure of approximately between 40 and 80 pounds per square inch.

5. The method of claim 1, where the heating step comprises a temperature of approximately between 70 degrees Celsius, which is equivalent to 158 degrees Fahrenheit, and 100 degrees Celsius, which is equivalent to 212 degrees Fahrenheit.

6. The method of claim 1 including a seventh step of repeating the heating, cooling and determining steps until the determining step determines that the puzzle-cut seam is satisfactory.

7. The method of claim 5, wherein the heating step including a step of applying heat to the inner belt surface at a point proximate to the juncture.

8. The method of claim 1, the heating applied by a heating element, the cooling step including a step of cooling the heating element with water.

9. The method of claim 1, including a subsequent step of mechanically polishing the treated puzzle-cut seam to remove the adhesive material from the outer belt surface, resulting in nil differential seam thickness in the treated puzzle-cut seam.

10. The method of claim 1, wherein the flexible belt comprises a photoreceptor belt.

11. The method of claim 3, wherein the compressing step comprises a pressure of approximately 40 to 80 pounds per square inch and the heating step comprises a temperature of approximately 70 to 100 degrees Celsius.

12. The method of claim 9, wherein the adhesive strip has an adhesive strip width of approximately 1 to 10 millimeters, the compressing step comprises a pressure of approximately 40 to 80 pounds per square inch and the heating step comprises a temperature of approximately 70 to 100 degrees Celsius.

13. The method of claim 1, wherein the first puzzle-cut pattern of fingers comprises a series of alternating fingers, each finger forming a neck and an attached circular-shaped head whose head diameter is greater than its neck width, and the second puzzle-cut pattern of fingers comprises a series of alternating fingers, each finger forming a neck and an attached circular-shaped head whose head diameter is greater than its neck width, such that the first and second puzzle-cut patterns of fingers are able to mate to form an endless belt.

14. The method of claim 13, wherein the head diameter of each finger of the first puzzle-cut pattern of fingers and the second puzzle-cut pattern of fingers is from 0.1012 to 1.0160 millimeter.

15. The method of claim 14, wherein the adhesive strip has an adhesive strip width of approximately 1 to 10 millimeters, the compressing step comprises a pressure of approximately 40 to 80 pounds per square inch and the heating step comprises a temperature of approximately 70 to 100 degrees Celsius.

16. The method of claim 14, including a subsequent step of mechanically polishing the treated puzzle-cut seam to remove the adhesive material from the outer belt surface, resulting in nil differential seam thickness in the treated puzzle-cut seam.

17. The method of claim 16, wherein the adhesive strip has an adhesive strip width of approximately 1 to 10 millimeters, the compressing step comprises a pressure of approximately 40 to 80 pounds per square inch and the heating step comprises a temperature of approximately 70 to 100 degrees Celsius.

* * * * *